C. W. TARR.
LIFTING-JACK.
No. 182,721. Patented Sept. 26, 1876.
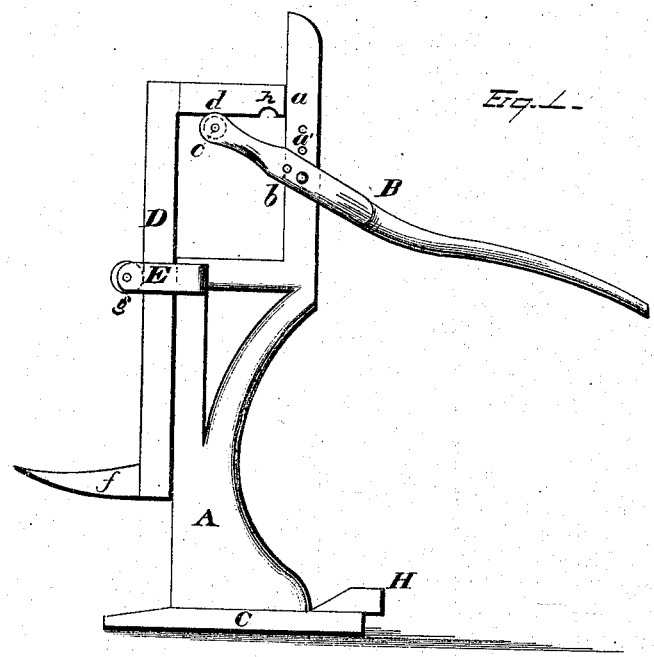
WITNESSES
INVENTOR

UNITED STATES PATENT OFFICE.

CHARLES W. TARR, OF PLYMOUTH, OHIO, ASSIGNOR OF ONE-HALF HIS RIGHT TO KROENKE, TARR & ARNOLD, OF SAME PLACE.

IMPROVEMENT IN LIFTING-JACKS.

Specification forming part of Letters Patent No. 182,721, dated September 26, 1876; application filed August 30, 1876.

*To all whom it may concern:*

Be it known that I, CHARLES W. TARR, of Plymouth, in the county of Richland and State of Ohio, have invented certain new and useful Improvements in Combined Lifting-Jack and Stump and Post Puller; and I do hereby declare the following to be a full, clear, and exact description of the invention, such as will enable others skilled in the art to which it pertains to make and use it, reference being had to the accompanying drawings, which form part of this specification.

My invention relates to combined lifting-jacks, stump and post pullers.

In the drawing, Figure 1 represents a side elevation of a lifting-jack embodying my invention. Fig. 2 is a plan view of the base.

My invention consists of the parts and combinations, as hereinafter more fully set forth and claimed, wherein—

A represents the frame of the jack, of cast-iron, attached to the broad base C. B is the operating lever, provided with several apertures or holes, $b$, for the purpose of attachment to the similarly-perforated arm $a$ of the frame, by means of a pin or bolt, and for increasing or diminishing the leverage, as may be required, according as one or the other of said apertures $b$ is employed. Said lever is also provided at its operating end with a small pulley, $c$, which acts on the under side of the arm $d$ of the lifting-bar D, and serves to greatly reduce the friction which would otherwise exist. D is the lifting-bar, provided at its upper end with the arm $d$, upon which the lever B operates, and at its lower end with a sharp-pointed hook or prong, $f$. E E are two guide-pieces fixed to the frame of the jack, in the ends of which is journaled a small pulley, $g$. These guide-pieces and pulley are for the purpose of keeping the lifting-bar in place, and to facilitate the movement of the same by reducing the friction.

The bar D and the hook $f$ are preferably made of wrought-iron.

The arm $d$ has a slot or depression, $h$, which operates in connection with the pulley $c$ or the lever B to lock the jack when the lifting-bar has been raised to its highest position.

The base C is enlarged at its rear end, or has a projection, H, formed thereon, for the purpose of affording a striking-surface in cases where the hook $f$ is to be driven into a stump or post. The front part of the base is forked, as shown in the drawing, to permit the descent of the hook $f$ to a level with the base.

The operation is as follows: The jack is placed so that the object to be lifted rests either on the arm $d$ or on the hook $f$. By depressing the handle of the lever B the pulley $c$ on its end comes in contact with the arm $d$ of the lifting-bar D, and operates to elevate the same until the depression $h$ is reached, which receives the pulley, and thus locks the device. In case a stump or post is pulled, the hook or prong $f$ is driven into the same by blows on the projection or enlarged portion H of the base. The lever B is adjusted up or down on the arm $a$ according to the height an object is to be raised, and is adjusted by the holes $b\ b$ according to the power required.

What I claim as my invention, and desire to secure by Letters Patent, is—

1. The combination, with the standard and operating lever of a lifting-jack, of the lifting-bar D adjustably secured to the standard, the said bar D provided with hook $f$ and arm $d$, substantially as and for the purpose set forth.

2. The combination, with the standard of a lifting-jack, and an adjustable lifting-bar, D $f$ $d$, secured thereto, of an adjustable lever, B, substantially as and for the purpose set forth.

3. The combination, with the standard of a lifting-jack having lifting-bar D secured in the guide E $g$, of the lever B, provided with a roller, $c$, adapted to work in contact with the arm $d$, and lock in the groove $h$, substantially as and for the purpose set forth.

4. The combination in a lifting-jack of the standard A, provided with lever B and heel H of the lifting-bar D, constructed with arm $d$ and hook $f$, substantially as and for the purpose set forth.

In testimony whereof I have signed my name to this specification in the presence of two subscribing witnesses.

CHARLES W. TARR.

Witnesses:
J. B. GETMON,
TOBIAS TROUGER.